US011219075B2

(12) United States Patent
Keller

(10) Patent No.: US 11,219,075 B2
(45) Date of Patent: Jan. 4, 2022

(54) SYSTEMS AND METHODS FOR PROVIDING A MOBILITY SERVICE

(71) Applicant: Honda Motor Co., Ltd., Tokyo (JP)

(72) Inventor: James R. Keller, Rochester, MI (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/166,621

(22) Filed: Oct. 22, 2018

(65) Prior Publication Data

US 2020/0128598 A1 Apr. 23, 2020

(51) Int. Cl.
*H04W 84/00* (2009.01)
*H04W 76/15* (2018.01)
*H04L 29/08* (2006.01)
*H04W 4/70* (2018.01)
*H04W 84/04* (2009.01)
*H04W 88/08* (2009.01)

(52) U.S. Cl.
CPC ............ *H04W 76/15* (2018.02); *H04L 67/12* (2013.01); *H04W 4/70* (2018.02); *H04W 84/005* (2013.01); *H04W 84/042* (2013.01); *H04W 88/08* (2013.01)

(58) Field of Classification Search
CPC . H04W 76/15; H04W 84/005; H04W 84/042; H04W 4/70; H04W 88/08; H04L 67/12
See application file for complete search history.

(56) References Cited

U.S. PATENT DOCUMENTS

| 6,243,039 | B1 | 6/2001 | Elliot | |
|---|---|---|---|---|
| 7,840,427 | B2 | 11/2010 | O'Sullivan | |
| 2008/0195428 | A1* | 8/2008 | O'Sullivan | ............ G08G 1/123 705/6 |
| 2015/0324717 | A1* | 11/2015 | Lord | ............. G06Q 10/063114 705/7.13 |
| 2016/0019473 | A1* | 1/2016 | Yadidi | .................... G06Q 10/02 705/2 |
| 2016/0027306 | A1 | 1/2016 | Lambert et al. | |
| 2016/0193094 | A1 | 7/2016 | Bertrand | |
| 2016/0314265 | A1* | 10/2016 | Sternberg | ................ G06F 17/27 |
| 2017/0228684 | A1* | 8/2017 | Perry | .................. G06F 3/04817 |
| 2017/0308082 | A1* | 10/2017 | Ullrich | ................. G05D 1/0038 |
| 2018/0038706 | A1* | 2/2018 | Ellenby | ............. G01C 21/3484 |
| 2018/0053229 | A1 | 2/2018 | Bhatnagar et al. | |

(Continued)

Primary Examiner — Lakeram Jangbahadur
(74) Attorney, Agent, or Firm — Rankin, Hill & Clark LLP

(57) ABSTRACT

Systems and methods for providing a mobility service are described. A method for providing a mobility service includes receiving a request from a user. The request includes a mobility device to assist the user and at least one logistical factor. Logistical factors may include timing, an origin, or a destination. The method also includes scheduling the mobility device and a companion vehicle for the user based, at least in part on, the at least one logistical factor. The companion vehicle provides the user transportation on at least a portion of a route between the origin and the destination. The method also includes generating data based on providing the user transportation. The generated data includes one or more of request data associated with the request, user data associated with the progress of the user on the route, mobility device data associated with the mobility device, and companion vehicle data associated with the companion vehicle.

20 Claims, 7 Drawing Sheets

(56) References Cited

U.S. PATENT DOCUMENTS

2018/0311085 A1* 11/2018 Lacaze .................. A61G 3/062
2019/0086223 A1*  3/2019 Tanaka ............. G08G 1/096866
2019/0228465 A1*  7/2019 Moore ............... G06Q 30/0645

* cited by examiner

SYSTEMS AND METHODS FOR PROVIDING A MOBILITY SERVICE

BACKGROUND

For individuals that suffer from reduced mobility, transportation planning can be challenging because multiple devices may be needed to help the individual reach a location and navigate about the location once there. The National Center for Senior Transportation found that nearly 75% of seniors find transportation either "challenging" or "very difficult." These seniors may miss out on interactions with friends, family, and neighbors, entertainment experiences, exercise opportunities, etc. Accordingly, reduced mobility can adversely affect an individual's health, social wellness, and/or emotional state.

BRIEF DESCRIPTION

According to one aspect, a method for providing a mobility service includes receiving a request from a user. The request includes a mobility device to assist the user and at least one logistical factor. Logistical factors may include timing, an origin, or a destination. The method also includes scheduling the mobility device and a companion vehicle for the user based, at least in part on, the at least one logistical factor. The companion vehicle provides the user transportation on at least a portion of a route between the origin and the destination. The method also includes generating data based on providing the user transportation. The generated data includes one or more of request data associated with the request, user data associated with the progress of the user on the route, mobility device data associated with the mobility device, and companion vehicle data associated with the companion vehicle.

According to another aspect, a mobility system for providing a mobility service includes a request receiving module, a schedule module, and a data module. The request receiving module receives request from a user. The request includes a mobility device to assist the user and at least one logistical factor. Logistical factors may include timing, an origin, or a destination. The request receiving module also compares the request to a user profile and identifies an additional logistical factor from the user profile based on the request. The schedule module schedules the mobility device and a companion vehicle for the user based, at least in part on, the at least one logistical factor and the additional logistical factor. The companion vehicle provides the user transportation on at least a portion of a route between the origin and the destination. The data module generates data including one or more of request data associated with the request, user data associated with the progress of the user on the route, mobility device data associated with the mobility device, and companion vehicle data associated with the companion vehicle.

According to a further aspect, a non-transitory computer-readable storage medium storing instructions that, when executed by a computer, causes the computer to perform a method. The method in includes receiving a request from a user. The request includes a mobility device to assist the user and at least one logistical factor. Logistical factors may include timing, an origin, or a destination. The method also includes scheduling the mobility device and a companion vehicle for the user based, at least in part on, the at least one logistical factor. The companion vehicle provides the user transportation on at least a portion of a route between the origin and the destination. The method includes generating data including one or more of request data associated with the request, user data associated with the progress of the user on the route, mobility device data associated with the mobility device, and companion vehicle data associated with the companion vehicle.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings.

DETAILED DESCRIPTION

Figure 1:
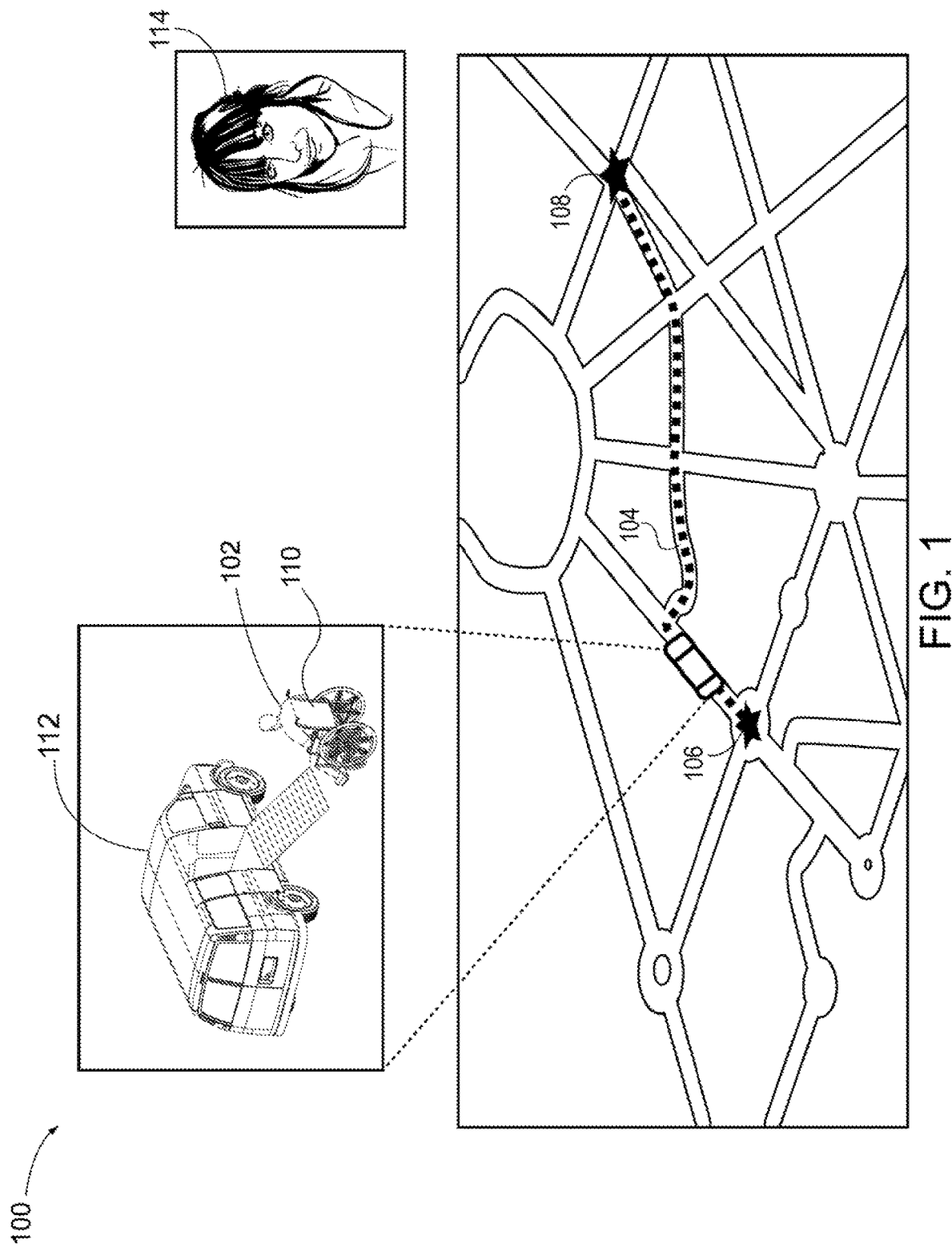
FIG. 1 is a schematic diagram of a user environment for providing a mobility service to an exemplary embodiment.

The systems and methods discussed herein are generally directed to providing a mobility service that allows a user to request a mobility device and a companion vehicle. In some embodiments, the mobility service can connect to the user's calendar to help identify logistic solutions. The mobility service may be accessed using a portable device or access a remote system. The mobility system can also integrate with other features of a portable device, such as a camera for shared remote experiences using social media.

The mobility system may also allow a caregiver, such as a family member, physician, nurse, custodian, executor health aid, etc. of the user to oversee the mobility service. For example, the caregiver may be able to approve, modify, or deny the user's requests. The caregiver may also be able to use the mobility service to monitor the progress of request process, travel, or the health of the user. The mobility system may also allow a caregiver to facilitate healthcare decisions remotely by accessing details of the user's use of the mobility device.

Definitions

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Processor Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication," as used herein, refers to a communication between two or more computing devices (e.g., computer, personal digital assistant, cellular telephone, network device, vehicle, vehicle computing device, infrastructure device, roadside equipment) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface" as used herein can include input and/or output devices for receiving input and/or devices for outputting data. The input and/or output can be for controlling different vehicle features which include various vehicle components, systems, and subsystems. Specifically, the term "input device" includes, but it not limited to: keyboard, microphones, pointing and selection devices, cameras, imaging devices, video cards, displays, push buttons, rotary knobs, and the like. The term "input device" additionally includes graphical input controls that take place within a user interface which can be displayed by various types of mechanisms such as software and hardware-based controls, interfaces, touch screens, touch pads or plug and play devices. An "output device" includes, but is not limited to: display devices, and other devices for outputting information and functions.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk, data store, and/or a memory.

"Data store," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Display," as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be accessible through various devices, for example, though a remote system. The display may also be physically located on a portable device, mobility device, or vehicle.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DR- RAM). The memory can store an operating system that controls or allocates resources of a computing device.

"Mobility device," as used herein, is any device designed to assist a user's mobility. Exemplary mobility devices can include, but are not limited to manual self-propelled wheelchairs, manual attendant-propelled wheelchairs, powered wheelchairs, mobility scooters, single-arm drive wheelchairs, reclining tilting wheelchairs, standing wheelchairs, sports wheelchairs, wheelchair stretchers, all-terrain wheelchairs, self-balancing wheelchairs, smart wheelchairs, body-powered prostheses, robotic prostheses, smart prostheses, movement assist apparatuses, walk assist devices, stair climbing aids, lifts, walkers, mobility scooters, balance bicycles, carts, strollers, and power braces. In some embodiments, the mobility device can include various sensors for sensing and determining various parameters of a user. For example, location, motion, and physiological parameters, among others. Some mobility devices have user input and output functionality.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software-controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"User," as used herein can include, but is not limited to, one or more biological beings such as an adult, a child, or an infant.

"Vehicle," as used herein, refers to any moving vehicle that is capable of carrying one or more users and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more users and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more users. Further, the term "vehicle" can include vehicles that are automated or non-automated with pre-determined paths or free-moving vehicles.

"Vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a steering system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

I. System Overview

Generally, the systems and methods disclosed herein are directed to providing a mobility service for a user. Referring now to the drawings, wherein the showings are for purposes of illustrating one or more exemplary embodiments and not for purposes of limiting same, FIG. 1 is a schematic diagram of a user environment 100 for implementing systems and methods for providing a mobility service for a user. In the illustrated embodiment of FIG. 1, the user environment 100 includes a user 102 that desires to travel on a route 104 from an origin 106 to a destination 108 for an outing.

The user 102 generates a request having one or more logistical factors. The logistical factors identify, at least in part, where the user would like to go. For example, the logistical factors may include, but are not limited to, at least a portion of the route 104, the origin 106, the destination 108, address, coordinates, point of interest, one or more roadway names, and a waypoint. The logistical factors also be an event, invitation, ticket, or other item associated with a time or location. For example, the logistical factors may include a time of arrival, appointment time, the time an event is scheduled to start, a time of departure, the duration of the outing, among others. Because the origin 106 and the destination 108 are logistical factors, like other logistical factors the origin 106 and the destination 108 may be an address, coordinates, point of interest, one or more roadway names, or a waypoint.

The route 104 is a path between the origin 106 and the destination 108. For clarity, only the origin 106 and the destination 108 are demarcated on the route 104. However, a request may include one or more additional destinations (e.g., stops, layovers, waypoints, locations, etc.). Therefore, a route 104 may have multiple destinations. Furthermore, the route 104 may be a round trip outing that leaves from the origin 106, travels to one or more destinations including the destination 108, and returns to the origin 106 or one of the previously visited destinations.

The route 104 may be a short range trip based on distance, such as within a campus, within an institution, within a few miles, within city limits, within a locality. The route 104 may also be considered short range based on the high frequency that the route 104 is traveled or the ease with which the route 104 can be traveled. Conversely, the route 104 may be a long-range trip based on distance, such as greater than 50 miles, outside city limits, between states. The route 104 may also be considered long range based on the route being infrequently traveled or difficult to traverse.

In addition to one or more logistical factors, the user 102 may identify a mobility device 110 in the request by including a candidate mobility device that is associated with the mobility device 110. Here, the mobility device 110 is illustrated as a wheelchair but the mobility device 110 may be any device designed to assist the user's mobility. In the event that the user 102 and/or the mobility device 110 does not have the ability or range to traverse the route 104, the user 102 may also request a companion vehicle 112 with the mobility device 110. In some embodiments, the user 102 may specify a companion vehicle 112 or generally request a companion vehicle 112 and be assigned a companion vehicle 112 based on companion factors, such as availability, compatibility with the mobility device 110, and/or user preference. Thus, the user 102 may request a mobility device 110 and a companion vehicle 112 to enable the user to travel the route 104 from the origin 106 to the destination 108. Alternatively, the request of the companion vehicle 112 may be inferred from the one or more logistical factors, the mobility device 110, and/or the companion vehicle 112.

In another embodiment, a caregiver 114 may initiate and/or generate the request. The caregiver 114 may also be able to affect the request made by the user 102. For example, the caregiver 114 may be able to make changes to at least one logistical factor, approve a request, provide a candidate mobility device, monitor progress on the route 104, and receive data, including media posts and alerts regarding the user 102. The caregiver 114 may be a parent, child, sibling, relative, friend, guardian, a person with power of attorney, a person listed in a medical directive, a person with medical agency, a nurse, aide, physician's assistant, physician, clinician, therapist, social worker, probation officer, among others.

Figure 2:
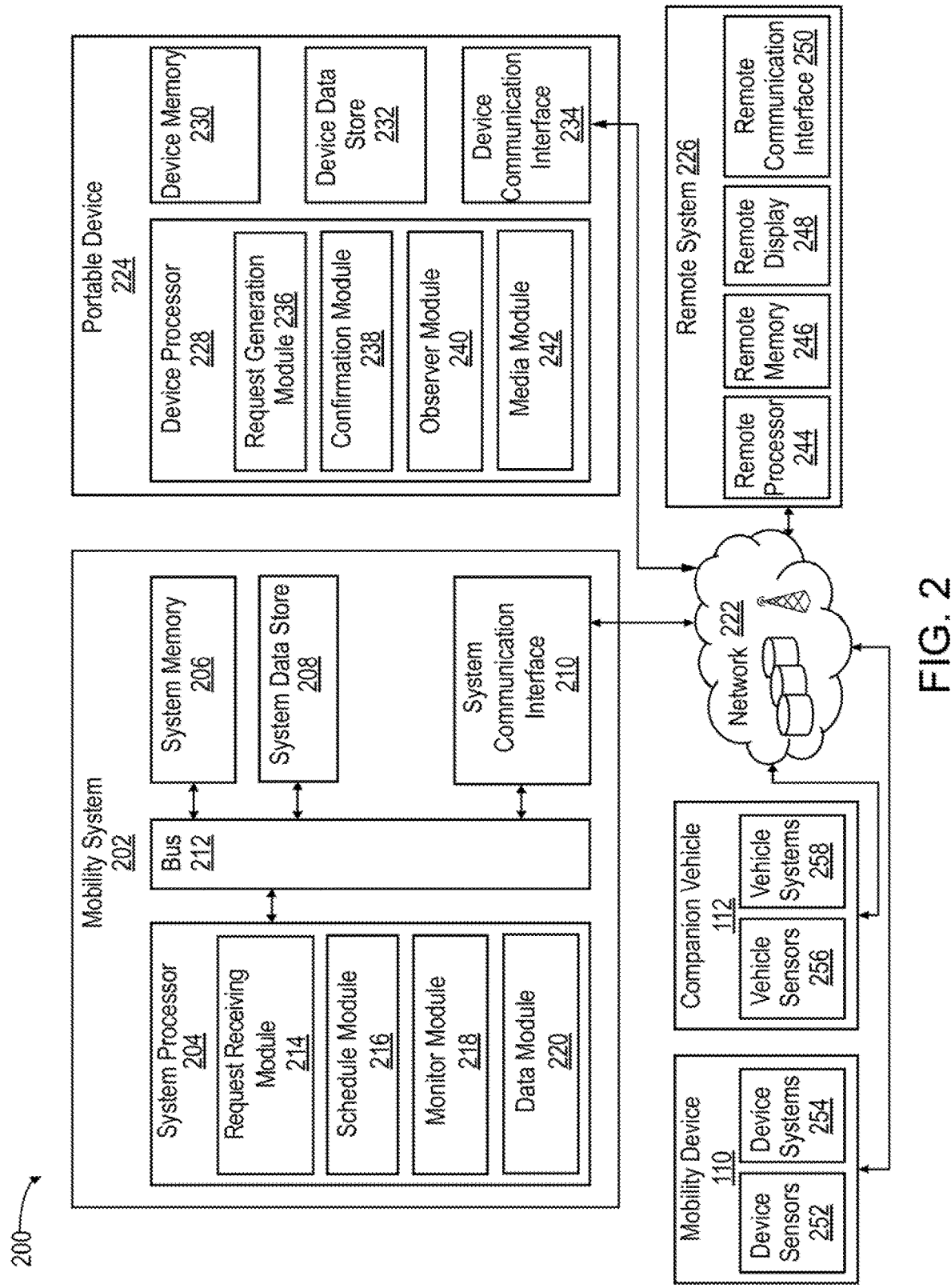
FIG. 2 is a schematic diagram of an operating environment for providing a mobility service according to an exemplary embodiment.

Turning to FIG. 2, the request is transmitted to a mobility system 202, as shown in an operating environment 200. FIG. 2 is a schematic diagram of the operating environment 200 for implementing systems and methods for providing a mobility service for the user 102. The components of the operating environment 200, as well as the components of other systems, hardware architectures, and software architectures discussed herein, can be combined, omitted, or organized into different architectures for various embodiments. Some components of the operating environment 200 can be implemented with or associated with a mobile application, the mobility device 110, the companion vehicle 112, a portable device 224, a remote system 226, or other device connected via a network (e.g., a network 222).

Generally, the mobility system 202 includes a system processor 204, a system memory 206, a system data store 208, and a system communication interface 210, which are each operably connected for computer communication via a bus 212 and/or other wired and wireless technologies. The system communication interface 210 provides software and hardware to facilitate data input and output between the components of the mobility system 202 and other components, networks, and data sources, which will be described herein. Additionally, the system processor 204 includes a request receiving module 214, a schedule module 216, a monitor module 218, and a data module 220, each suitable for providing a mobility service facilitated by the components of the operating environment 200. The mobility system 202 is also operably connected for computer communication (e.g., via the bus 212 and/or the system communication interface 210).

The mobility system 202 is also operatively connected for computer communication to the network 222, the mobility device 110, the companion vehicle 112, the portable device 224, and the remote system 226. It is understood that the connection from the system communication interface 210 to the network 222, the mobility device 110, the companion vehicle 112, the portable device 224, and the remote system 226, can be facilitated in various ways. For example, through a network connection (e.g., wired or wireless), a cellular data network from a portable device 224, etc.

The network 222 is, for example, a data network, the Internet, a wide area network, a local area network, or cellular data network. The network 222 serves as a communication medium to various remote devices (e.g., databases, web servers, remote systems, application servers, intermediary servers, client machines, other portable devices). In some embodiments, the mobility device 110, the companion vehicle 112, the portable device 224, and/or the remote system 226 can be accessed by the mobility system 202 through the network 222, and/or the network 222 can access the mobility device 110, the companion vehicle 112, the portable device 224, and/or the remote system 226. Thus, in some embodiments, the mobility system 202 can obtain data from the mobility device 110, the companion vehicle 112, the portable device 224, and/or the remote system 226 via the network 222.

The mobility system 202 can transmit and receive information directly or indirectly to and from the portable device 224, the remote system 226, the mobility device 110, and/or the companion vehicle 112, over the network 222. The portable device 224 can include a device processor 228, a device memory 230, device data store 232, and a device communication interface 234 that are configured to be in communication with one another. The device processor 228 includes a request generation module 236, a confirmation module 238, an observer module 240, and a media module 242 each suitable for providing a mobility service facilitated by the components of the operating environment 200.

Because the portable device 224 may have limited data storage availability or functionality, data transmission can be executed at and/or with other infrastructures and servers. For example, in FIG. 2, the remote system 226 can transmit and receive information directly or indirectly to and from the portable device 224, the remote system 226, the mobility device 110, and/or the companion vehicle 112, over the network 222. The remote system 226 can include a remote processor 244, a remote memory 246, a remote display 248, and a remote communication interface 250 that are configured to be in communication with one another. The system communication interface 210 can be used by the mobility system 202 to receive and transmit information to and from the remote system 226 and other servers, processors, and information providers through the network 222.

In some embodiments, the remote system 226 may be maintained by a third party such as the caregiver 114 of FIG. 1. For example, the caregiver 114 may maintain medical information in the remote memory 246 of the remote system 226. The medical information for the user 102 may include health and medical information of the user 102, such as information about medical conditions, disease, symptoms, and medications, among others. Further, in some embodiments, the remote system 226 can include medical information including historical physiological and/or historical behavioral data, normative baseline data, medical profile information, medical history, current health conditions, current medications, past appointment data, future appointment data, among others. The remote processor 244 may use the medical information in the remote memory 246 to determine information about a particular health state and/or the severity of a health state of the user. In some embodiments, the remote system 226 can be updated with medical information associated with the user 102 by the mobility system 202, user data of the mobility device 110, and/or the companion vehicle 112 on a periodic basis.

As discussed above, the mobility device 110 assists the user 102 with mobility. The mobility device 110 may also provide user data to the mobility system 202. The user data is associated with the user 102 using the mobility device 110 to improve the mobility of the user 102. The mobility device 110 can include integrated features, such as a computing device component (e.g., a processor, a memory, a communication interface, etc.) with logic circuitry, device sensors 252, and device systems 254.

The device sensors 252 sense and determining various parameters of the user 102, such as location data, physiological data, mobility device data, etc. Location data may include the global position of the user 102. Additionally or alternatively, the location data may be the position of the user 102 relative to an object in the user environment 100, such as the user's location on the route 104, the user's location relative to the origin 106, the user's location relative to the destination 108, or the user's location relative to the companion vehicle 112. In some embodiments, the location data may include the user's position in the companion vehicle 112. In other embodiments, the location data may be associated with the location and/or movement of the mobility device 110 associated with the user 102. Accordingly, the device sensors 252 may include position and motion sensors (e.g., global positioning system (GPS) sensor, accelerometer, magnometer sensors) integrated with the mobility device 110.

Physiological data can include, but is not limited to, heart information, such as, heart rate, heart rate pattern, blood pressure, oxygen content, among others. Physiological data can also include brain information, such as, electroencephalogram (EEG) measurements, functional near infrared spectroscopy (fNIRS), functional magnetic resonance imaging (fMRI), among others. Physiological data can also include digestion information, respiration rate information, salivation information, perspiration information, pupil dilation information, body temperature, muscle strain, as well as other kinds of information related to the autonomic nervous system or other biological systems of the user 102. In some embodiments, physiological data can also include behavioral data, for example, mouth movements, facial movements, facial recognition, head movements, body movements, hand postures, hand placement, body posture, and gesture recognition, among others. Accordingly, the device sensors 252 may also include, but are not limited to, temperature sensors, a heart rate sensor, pulse sensor, a breathing sensor, an image capture component, a biometric sensor, a pulse oxygen sensor, a light emitting diode sensor, a biological sensor, etc. integrated with the mobility device 110.

Physiological data can also include recognition data (e.g., biometric identification) used to identify the user 102. For example, recognition data can include a pre-determined heart rate pattern associated with the user 102, eye scan data associated with the user 102, fingerprint data associated with the user 102, among other types of recognition data. Additionally, some physiological data can be sensed and/or determined by the mobility device 110 using gesture tracking and/or recognition. The recognition data and other types of physiological data can be stored at various locations (e.g., the system data store 208, a memory integrated with the mobility device 110, the device memory 230, and/or the remote memory 246.

Because the use of the mobility device 110 is based on the health state of the user 102, the user data may also include mobility device data. The mobility device data includes information about the operation, maintenance, historical use of the mobility device 110. For example, the mobility device data may include timing data associated with when the mobility device 110 is in use or at rest, time stamped operational commands (e.g., forward, reverse, turn, reach, crouch) input by the user 102, among others. The mobility device data may also include charging data, such as when the mobility device 110 is low on charge, the amount of time necessary to charge the mobility device 110, range information given a current charge, charging alerts, etc. The mobility device data may also include maintenance information such as when the mobility device 110 was last serviced, future service dates, or service alerts.

As discussed above, the device sensors 252 are operable to sense a measurement of user data associated with the mobility device 110 and/or the user 102, and generate a data signal indicating said measurement of the user data. These data signals can be converted into other data formats (e.g., numerical) and/or used by the device systems 254 and/or the mobility system 202 to generate other data metrics and parameters. It is understood that the device sensors 252 can be any type of sensor, for example, acoustic, electric, environmental, optical, imaging, light, pressure, force, thermal, temperature, biological, proximity, among others.

The mobility system 202 can receive and/or access the user data from different sources. In one embodiment, the data module 220 receives the data from the device sensors 252. The user data may also be used by the device systems 254 to alter the manner in which the mobility device 110 provides mobility assistance to the user 102. The device systems 254 may, for example, include stabilization systems, positioning adjustment system, power tilt system, power recline system, adjustable height system, support system, maneuvering system, suspension system, input system, among others. The device systems 254 may include and/or be operably connected for computer communication to one or more of the device sensors 252. The user data may also be received from the remote system 226.

The companion vehicle 112 includes vehicle sensors 256 and vehicle systems 258. Vehicle data can include information related to the companion vehicle 112 including data from the vehicle sensors 256 and/or the vehicle systems 258. Exemplary vehicle data includes, but is not limited to, steering data, lane departure data, blind spot monitoring data, braking data, collision warning data, navigation data, collision mitigation data, auto cruise control data, vehicle model, vehicle make, vehicle identification number.

The vehicle sensors 256 can include, but are not limited to, vehicle speed sensors, accelerator pedal sensors, brake sensors, throttle position sensors, wheel sensors, anti-lock brake sensors, camshaft sensors, among others. The vehicle sensors 256 may also include, but are not limited to, cameras mounted to the interior or exterior of the companion vehicle 112 and radar and laser sensors mounted to the exterior of the companion vehicle 112. Further, the vehicle sensors 256 can include sensors external to the companion vehicle 112 (accessed, for example, via the network 222 of FIG. 2), for example, external cameras, radar and laser sensors on other vehicles in a vehicle-to-vehicle network, street cameras, surveillance cameras, among others.

The vehicle sensors 256 are operable to sense a measurement of vehicle data associated with the companion vehicle 112, the vehicle environment, the vehicle systems 258, and/or the user 102, and generate a data signal indicating said measurement of the vehicle data. These data signals can be converted into other data formats (e.g., numerical) and/or used by the vehicle systems 258 and/or the mobility system 202 to generate other data metrics and parameters. It is understood that the vehicle sensors 256 can be any type of sensor, for example, acoustic, electric, environmental, optical, imaging, light, pressure, force, thermal, temperature, proximity, among others.

The vehicle data can also be received from the one or more vehicle systems 258. The vehicle systems 258 may include and/or be operably connected for computer communication to one or more of the vehicle sensors 256. The vehicle systems 258 may also be controllable based on the vehicle data and or the user data. The vehicle data and/or user data may also be used by the vehicle systems 258 to alter the manner in which the companion vehicle 112 operates. For example, suppose that the user data indicates that the user 102 and/or the mobility device 110 is being jostled in the companion vehicle 112. The vehicle systems 258 may use this user data in conjunction with the vehicle data to alter the manner with which the companion vehicle 112 is operating by, for example, adjusting the acceleration or braking rates.

The operating environment 200, shown in FIG. 2 will now be described in operation according to an exemplary embodiment with reference to the user environment 100 of FIG. 1. As discussed above, the user 102 may desire to travel on the route 104 from an origin 106 to a destination 108 and wish to request a mobility device 110 to use along the route 104, at the origin 106, and/or at the destination 108. Accordingly, the user 102 may use a portable device 224, shown in FIG. 2, to generate a request.

In one embodiment, the request generation module 236 of the portable device 224 generates a request based on the user input at the portable device 224. The user 102 may manually input one or more logistical factors into the portable device 224 using an input device, such as a keypad, voice recognition, touch screen, etc. In some embodiments, the portable device 224 may run an application that allows the user 102 to interface with the request generation module 236. The application may be instructions in execution on the portable device 224, firmware, software in execution on the portable device 224, and/or combinations of each to perform a function(s) or an action(s), and/or to cause a function or action from another module, method, and/or system.

In some embodiments, the request may be made by the user 102 inputting information, such as logistical factors and/or a candidate mobility device that identifies the mobility device 110, in a fillable form style or the information may be entered using voice recognition. The user 102 may also input one or more destinations, one or more candidate mobility devices, and one or more candidate companion vehicles, among other transportation features that the user 102 desires for the outing. In another example, the user 102 may speak vocally list one or more logistical factors and/or transportations features to a smart speaker.

Alternatively, the user 102 may generate a request that references another source for information. For example, the user 102 may generate a request based on logistical factors from an electronic or online calendar or datebook. For example, the user 102 may generate a request for 'transportation next Thursday.' The request generation module 236 may access the user's calendar on the remote system 226 to determine if an event (e.g. appointment, meeting, date, party, etc.) is occurring and supplement the generated request with information, including one or more additional logistical factors and/or the mobility device 110, from the user's calendar.

In another embodiment, the request generation module 236 may automatically generate a request based on predictive data that is used to identify or predict one or more logistical factors. The predictive data may be harvested from other sources such as the electronic or online calendar or datebook, historical use patterns, third party management, among others. For example, suppose the caregiver 114 is associated with a medical office. When the user 102 books an appointment with the medical office, a calendar invite may be created for the user's online calendar to correspond to the appointment. The caregiver 114 or the calendar invite may include predictive data, such as the time of the appointment, the location of the medical office, accessible entrances, among others. The request generation module may harvest the predictive data from the caregiver 114, who is a third-party, or from the calendar invite to predict that the user will desire to travel on the route 104 from an the destination 108, the building address of the medical office, at a given time. Accordingly, the request generation module 236 may calculate the one or more logistical factors from the predictive data and generate a request based on the calculated one or more logistical factors.

The request based on the calculated one or more logistical factors, may also predict the mobility device 110 that the user 102 may wish to use. For example, the mobility device 110 desired by the user 102 may be predicted based the user's predefined preferences, the user's historical selections, the user's historical selections based on the one or more logistical factors, etc. Suppose that the user 102 selects a first mobility device when the destination 108 is outdoors but a second mobility device when the destination 108 is indoors. In view of the example given above, the request generation module 236 may select the second mobility device as the candidate mobility device since the medical office has a building address and thus is likely indoors.

Once the request with one or more logistical factors is generated, the request generation module 236 transmits the request to the mobility system 202 using the network 222. The request is received by the request receiving module 214. The request receiving module 214 identifies the one or more logistical factors, including the one or more additional logistical factors, and/or the candidate mobility device from the request. For example, suppose the request was generated using a fillable form, the request receiving module 214 may segment the fillable form to extract the one or more logistical factors and/or the candidate mobility device from the request. Likewise, the request receiving module 214 may extract the one or more logistical factors and/or the candidate mobility device from the other sources. For example, suppose the one or more logistical factors are not extracted from the user's calendar by the request generation module 236, and instead the request generation module 236 includes a reference to the other source in the request. The request receiving module 214 may access the other sources, which for example may be on the remote system 226, to extract the one or more logistical factors and/or the candidate mobility device.

In another embodiment, the request receiving module 214 may compare the request to a user profile. The user profile includes information about the user. For example, the user profile may include demographic information, user preferences, medical information, physiological baselines, as well as rules for the user 102. The request may be compared to the user profile to supplement the request with one or more additional logistical factors. Suppose the user 102 generates a request but does not specify a mobility device 110 the user 102 would like to use. The request may be compared to the user profile to identify whether the user has a preferred mobility device or a default mobility device. For example, the user may list a default mobility device to be selected as the candidate mobility device when the mobility device 110 is not specified in the request.

In another embodiment, the user may have plurality of preferred mobility devices that can be selected from based on the one or more logistical factors present in the request. For example, the user 102 may have a first preferred mobility device, listed in the user profile, when the logistical factors indicate that the user will be shopping. Thus, if the destination 108 is a shopping mall, grocery store, or retailer, the first preferred mobility device is selected as the candidate mobility device for the request. When the one or more logistical factors indicate that user 102 will be participating in a sporting activity, the user may have a second preferred mobility device listed in the user profile. Suppose, the physiological data of the user indicates that the user has an increased heart rate and galvanic skin response when the user is at the destination 108. When a request is received for transportation to the destination 108, the second preferred mobility device may be selected for the user 102 as the candidate mobility device by the request receiving module 214 because the user 102 may be engaged in an activity at the destination 108. In this manner, the request receiving module 214 may identify an additional logistical factor or the mobility device 110, based on comparing the request to the user profile.

The user 102 may also be subject to rules regarding the transportation for the outing. The rules for the user 102 may be stored in an approval matrix of the user profile. The approval matrix includes allowed logistical factors, conditional logistical factors, and prohibited logistical factors. For example, a user 102 may be allowed to independently request transportation for short ranges, but may need approval for a long-range trip. Thus, logistical factors indicative of a long range trip, such a destination that is more than 50 miles away, may be deemed prohibited logistical factors. Accordingly, the request receiving module 214 may compare the request to the approval matrix to determine if the one or more logistical factors of the request are feasible based on the allowed logistical factors and prohibited logistical factors. Thus, the request receiving module 214 can make a threshold determination as to whether the request should be scheduled.

The approval matrix may also include allowed, conditional, and prohibited mobility devices. Suppose the caregiver 114 approves a first mobility device for an outing in which the user 102 will be at the destination for more than a predetermined amount of time, but requires that a second mobility device be used for an outing lasting less than the predetermined amount time. Here the selection of the first mobility device is conditional on the length of the outing. For example, in a situation where the caregiver 114 is attempting to improve the user's mobility, the first mobility device may be a wheelchair, while the second mobility device is a power-assist brace. If the user 102 selects the first mobility device, the wheelchair, as the candidate mobility device in the request for an outing lasting less than the predetermined amount of time, the request receiving module 214 or the request generation module 236 may change the request based on the approval matrix of the user profile. Therefore, the mobility system 202 and/or the portable device 224 can alter the request to comport with the user profile.

Additionally or alternatively, the caregiver may be prompted to approve a request or make changes to the request by the request receiving module 214 or the request generation module 236. For example, if the user 102 selects a candidate mobility device that is ineligible according to the approval matrix, the caregiver 114 may be prompted to approve the user's selection or select a different candidate mobility device. Continuing the example from above, suppose the user 102 selects the first mobility device, the wheelchair, as the candidate mobility device in the request for an outing lasting less than the predetermined amount of time, the caregiver 114 may be alerted accept the first mobility device as the candidate device or change the candidate mobility device.

The user profile may be maintained by the mobility system 202, for example, by the request receiving module 214, the portable device 224, or the remote system 226. The user profile may also be distributed among multiple modules (e.g., the request receiving module 214, the request generation module 236, etc.) or devices (the mobility device 110, the companion vehicle 112, the portable device 224, the remote system 226, etc.). In some embodiments, the user 102 may have access to the user profile and the authority to make changes. Additionally or alternatively, a caregiver 114 may have access to the user profile and the authority to make changes. In other embodiment, the user 102 and the caregiver 114 may have either access to the user profile or the authority to make changes to specific portions of the user profile. For example, the user 102 may be able to make changes to user preferences, while the caregiver 114 can make changes to the approval matrix.

The one or more logistical factors, including the additional logistical factors, and the mobility device 110 extracted and derived from the request are used by the schedule module 216 to schedule transportation for the user 102. In particular, the schedule module 216 schedules the mobility device 110 and a companion vehicle 112 for the user 102 based, at least in part on, the one or more logistical factors, the one or more additional logistical factors, the user profile, and/or the candidate mobility device identified in the request.

The schedule module 216 schedules the mobility device 110 and the companion vehicle 112 to provide transportation on at least a portion of a route 104 between the origin 106 and destination 108. The mobility device 110 and/or the companion vehicle 112 may be scheduled based on the request, user preferences, and/or the user profile, as well as availability. For example, the schedule module 216 may attempt to satisfy multiple requests for mobility devices and companion vehicles by secluding the mobility device 110 from a plurality of mobility devices or the companion vehicle 112 from a vehicle fleet having a plurality of vehicles.

In some embodiments, the schedule module 216 may schedule the companion vehicle 112 based on the candidate mobility device provided in the request from the request receiving module. For example, the mobility device 110 may be designed to work with a specific vehicle. Accordingly, when the mobility device 110 is requested, the specific vehicle designed to work with the mobility device 110 would be scheduled as the companion vehicle 112.

In some embodiments, the schedule module 216 may maintain a pairing listing of mobility devices and companion vehicles. Furthermore, the pairing listing may include rankings for different pairings of mobility devices and companion vehicles. For example, the mobility device 110 may be listed in the paring listing as pairing first with a first companion vehicle, second with a second companion vehicle and third with a third companion vehicle. Therefore, if the first companion vehicle and the second companion vehicle are not available, the schedule module 216 would pair the mobility device 110 with the third companion vehicle as the companion vehicle 112. The pairing listing may identify individual mobility devices and companion vehicles or categories of mobility devices and companion vehicles. For example, a category of mobility device may be the type of mobility device, such as brace, walker, wheelchair, the make of the mobility device 110, and/or model of the mobility device 110.

The schedule module 216 may also schedule the mobility device 110 and/or the companion vehicle 112 based on the user data and/or vehicle data. Suppose the charge of the mobility device 110 is expected to low due to use by a different user. The schedule module 216 may schedule a companion vehicle 112 with charging capability to accompany the mobility device 110. In another embodiment, the schedule module 216 may predict the arrival charge of the mobility device 110 when the mobility device 110 reaches the origin 106. The schedule module 216 may then determine whether the arrival charge satisfies a threshold charge. If the arrival charge does satisfy the threshold charge, the schedule module 216 may schedule a non-charge capable vehicle as the companion vehicle 112. If the arrival charge does not satisfy the threshold charge, the schedule module 216 may select a charge capable vehicle as the companion vehicle 112.

As described the schedule module 216 may schedule the mobility device 110 and the companion vehicle 112 to arrive together at the origin 106. However, the schedule module 216 may schedule the mobility device 110 to arrive before the companion vehicle 112, for example, to assist the user in preparing for transportation. Alternatively, the schedule module 216 may schedule a detour from the route 104 to pick up the mobility device 110, change the companion vehicle 112, accommodate a different user, traffic concerns, etc. The schedule module 216 may also schedule the mobility device 110 to be at the destination 108 at the estimated time of arrival of the user 102.

Figure 3:
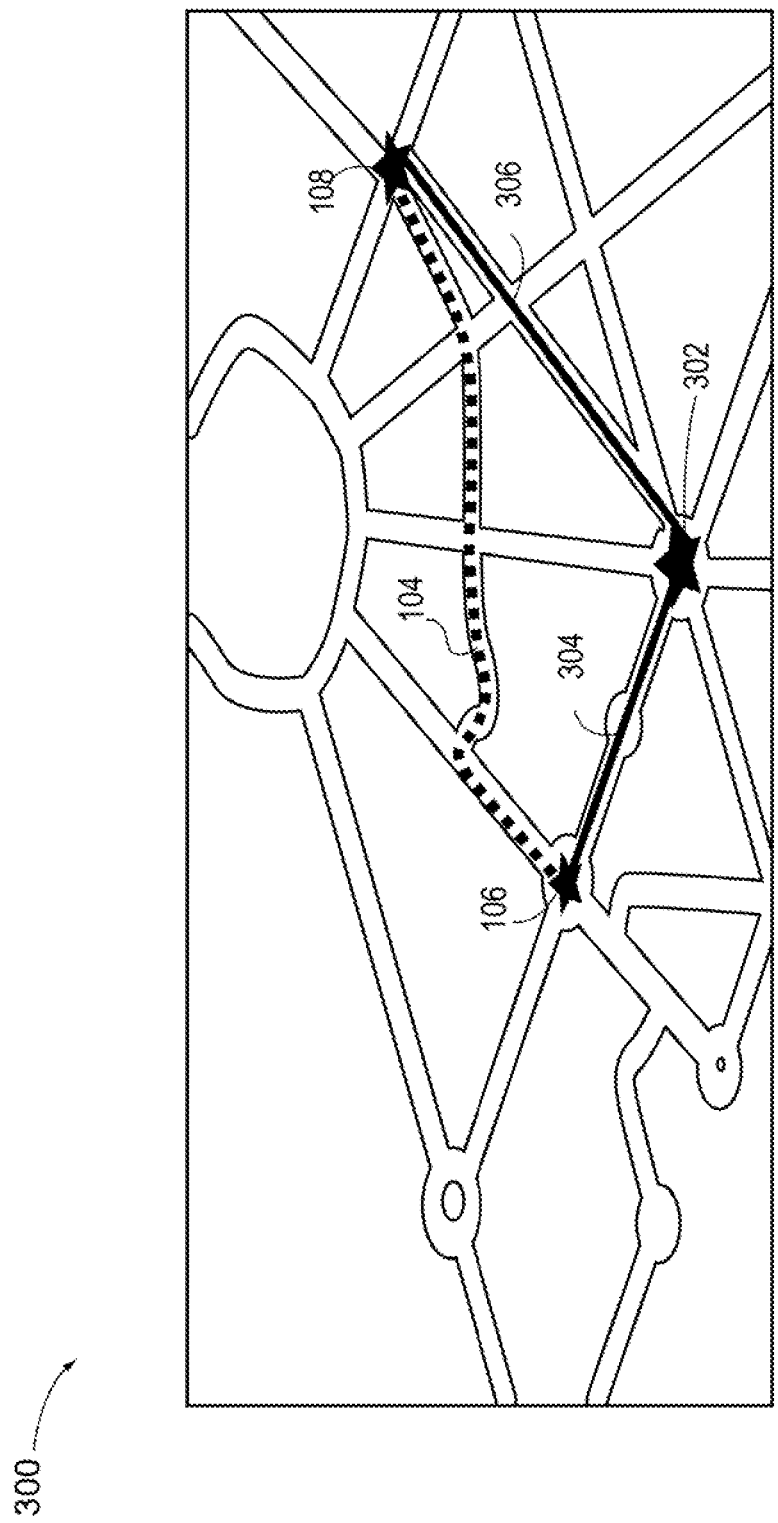
FIG. 3 is a schematic diagram of a user environment having a modified route according to an exemplary embodiment.

The schedule module 216 may also modify the route 104. Turning to FIG. 3, a user environment 300 having a modified route is shown. As discussed above, the schedule module 216 may schedule a detour from the route 104 to pick up the mobility device 110, change the companion vehicle 112, accommodate a different user, traffic concerns, etc. For example, the request may define a route 104 from the origin 106 to the destination 108. However, the schedule module 216 may generate a modified route to a waypoint 302 such that the modified route includes a first leg 304 from the origin 106 to the waypoint 302 and a second leg 306 from the waypoint 302 to the destination 108. Therefore, instead of the route 104, the user 102 would travel the first leg 304 and the second leg 306 to the destination 108.

The schedule module 216 may also modify the route 104 based on a subsequent request. Suppose that a request for round-trip transportation is automatically generated by the request generation module 236 based on a doctor's appointment being scheduled for the user 102. The user 102 may manually generate a subsequent request to stop at the waypoint 302 when returning from the destination 108 with the relevant logistical factors. Accordingly, the schedule module 216 may subsequently schedule a modified route including the first leg 304 and the second leg 306 in response to the subsequent request being received by the request receiving module 214. In this example, the user 102 may travel the route 104 from the origin 106 to the destination 108, but travel the modified route, including the first leg 304 and the second leg 306 from the destination 108 returning to the origin 106.

Moreover, the schedule module 216 may modify the route 104, while the user is traveling. Continuing the example above, suppose the user determines that the user 102 would like to stop at waypoint 302 while the user 102 is at the destination 108 and generates the subsequent request. The schedule module 216 may schedule the modified route based on approval, availability, user data, and vehicle data among others. For example, the schedule module 216 may initially determine if based on other scheduling constraints if the mobility device 110 and the companion vehicle 112 will be available based on the subsequent request. As such, the schedule module 216, may calculate the additional time, fuel, charge, etc., needed to change the distance and/or duration of the outing.

The schedule module 216 may also compare the subsequent request to the user profile. For example, the approval matrix of the user profile may indicate that the user 102 cannot be out past a certain time or event, such as sunset. If scheduling the subsequent request would cause the user 102 to be out after sunset, and thus, in violation of the approval matrix, the schedule module 216 may transmit a violation alert to indicate to the user 102 that the subsequent request could not be scheduled. In some embodiments, the violation alert may be received by the confirmation module 238. The violation alert may be an auditory signal, a vibrational signal, a visual signal, a text message, an electronic mailing, or a push notification, among others.

The schedule module 216 may also schedule the mobility device 110 to be a plurality of devices. For example, the schedule module 216 may schedule both a brace and a cane as the mobility device 110. Likewise, the schedule module 216 may schedule the companion vehicle 112 as plurality of vehicles. For example, suppose the user 102 requests round-trip transportation from the origin 106 to the destination 108 and returning to the origin 106. The schedule module 216 may schedule a first companion vehicle from the origin 106 to the destination 108 and a second companion vehicle from the destination 108 returning to the origin 106. Accordingly, the schedule module 216 may schedule the first companion vehicle and the second companion vehicle as the companion vehicle 112.

Once the schedule module 216 schedules the mobility device 110 and the companion vehicle 112 based on the one or more logistical factors, the schedule module 216 may transmit a confirmation to the originator of the request. For example, if the request generation module 236 of the portable device 224 generated the request, the schedule module may transmit the confirmation to the portable device 224. In this example, the confirmation module 238 may receive the confirmation. Alternatively, suppose the caregiver 114 generated the request from the remote system 226. The remote system 226 may receive the confirmation. The confirmation may include the details of the scheduled transportation including any changed logistical factors or a change in the mobility device 110 that deviates from the mobility device 110 or the one or more logistical factors provided in the request.

In some embodiments, the confirmation module 238 may compare the confirmation to the request to identify the changed logistical factors and generate a confirmation alert based on the changed logistical factors. For example, returning to the example where the caregiver 114 approves a first mobility device for outings in which the user 102 will be at the destination 108 for more than a predetermined amount of time, but requires that a second mobility device be used for outing lasting less than the predetermined amount time. Suppose the outing is scheduled to last less than the predetermined amount of time and the request receiving module changes the request from the first mobility device (i.e., the wheelchair) to the second mobility device (i.e., the brace). Accordingly, the schedule module 216 schedules the second mobility device as the mobility device 110. The confirmation module 238 identifies the change based on the comparison of the request to the confirmation and generates the confirmation alert that the second mobility device was scheduled as the mobility device 110. The confirmation alert may be an auditory signal, a vibrational signal, a visual signal, a text message, an electronic mailing, or a push notification, among others.

In some embodiments, the confirmation, any confirmation alerts, and possibly any violation alerts, as discussed above, may also be provided to third parties. Suppose the user 102 generated the request from the portable device 224. The schedule module 216 may transmit the confirmation to the caregiver 114, for example, on the remote system 226. If a confirmation alert is generated by the confirmation module 238, the confirmation alert may also be transmitted to the caregiver by way of the remote system 226. In this manner, the caregiver 114 may be made aware of the user 102 scheduling transportation and any changes that may occur during scheduling. Alternatively, if the caregiver 114 generated the request from the remote system 226, the user may receive confirmation at the confirmation module 238.

After transportation from the outing is scheduled by the schedule module 216, the progress of the outing can be monitored by the monitor module 218. In particular, the monitor module 218 enables monitoring of the scheduled outing, for example, on at least a portion of the route 104. Accordingly, the monitor module 218 allows the user 102, the caregiver 114, and/or a third party to monitor the progress of the user 102, the mobility device 110, and/or the companion vehicle 112 on at least a portion of the route 104. Furthermore, the monitor module 218 allows the user 102, the caregiver 114, and/or a third party to monitor the progress of the user 102, the mobility device 110, and/or the companion vehicle 112 before the reaching the origin 106, for example, once the companion vehicle 112 is dispatched to the origin 106, or after reaching the destination 108, for example, in a round trip situation. In some embodiments, the monitoring may take the form of a monitor feed including a visual representation of the route updated in real-time according to the user's progress, live-streamed data (e.g., captured images, physiological data, vehicle data, etc.), periodic data updates, among others, or a combination thereof.

The monitor module 218 may monitor the progress of the user 102 on the route 104. The monitoring may begin when the mobility device 110 and/or the companion vehicle 112 is dispatched to the origin 106 and/or destination 108. The user 102 may observe the monitoring using the observer module 240 of the portable device. For example, the observer module 240 may access the monitor module 218 to receive the monitor feed. Suppose the portable device 224 has a display, the observer module 240 may access the monitor module 218 over the network 222 and display the monitor feed on the display. Therefore, the user 102 can passively observe the monitor feed collected by the monitor module 218.

In addition to the user 102 observing the monitor feed from the monitor module, the caregiver 114 may also be able to observe the monitor feed. For example, the caregiver 114 may be able to observe the monitor feed by accessing the mobility system 202. The caregiver 114 may access the monitor feed through the network 222 using the remote system 226. Suppose, the caregiver 114 is a family relative of the user 102. The caregiver 114 may wish to ensure that the user 102 makes it safely to the destination 108. Accordingly, the caregiver 114 may use the remote communication interface 250 to access the mobility system 202. Accessing the mobility system 202 may include authenticating the caregiver 114 to access the monitor feed. Once the caregiver 114 has been granted access to the mobility system 202, the monitor module 218 may transmit the monitor feed to the remote system 226. For example, the monitor feed may be stored in the remote memory 246 or displayed at the remote display 248.

In some embodiments, the caregiver 114 receives monitor alerts when data from the monitor feed exceeds predetermined monitor thresholds. For example, as described above, the device sensors 252 of the mobility device 110 may collect physiological data from the user 102 as user data. The caregiver 114 may set monitor thresholds based on the physiological data. Suppose the caregiver 114 sets a monitor threshold for the monitor module 218 that a monitor alert is to be transmitted to the caregiver 114 when the user's blood pressure drops below a predetermined blood pressure. In the event that the physiological data indicates that the user's blood pressure has dropped below the predetermined blood pressure, the monitor module 218 transmits the alert to the caregiver 114 using, for example, the network 222.

In another example, the monitor threshold may be location, such as the origin 106, the destination 108, and waypoint 302. Suppose the caregiver 114 sets the monitor threshold as the destination 108 such that when the companion vehicle 112 reaches the destination 108, the monitor module 218 generates a monitor alert. In particular, through monitoring the vehicle sensors 256 and/or vehicle systems 258, the monitor module 218 may determine that the companion vehicle 112 has reached the destination 108. Once the monitor module 218 determines that the companion vehicle 112 has reached the destination 108, the monitor module 218 sends the monitor alert to the caregiver 114 indicating that the user 102 has arrived. In this manner, the monitor module 218 may send the caregiver 114 a monitor alert when a logistical factor is satisfied.

The monitoring described may be considered passive monitoring that observes the user 102, the mobility device 110, and/or the companion vehicle 112. In addition to passive monitoring, the monitor module 218 may be utilized for active monitoring. Active monitoring occurs when the user 102 or the caregiver 114 attempt to influence the behavior of the user 102 using the mobility device 110 or alter the operation the mobility device 110 and/or the companion vehicle 112. For example, the monitor module 218 may alert the user 102 to a facet of the operation of the mobility device 110 and/or the companion vehicle 112. In another example, the monitor module 218 may alter the operation of the mobility device 110 and/or the companion vehicle 112. The alerts and/or alterations may be made by the monitor module 218 in response to the user profile including the approval matrix, user data including physiological data, mobility device data including charge information, and vehicle data in addition to the monitor feed.

Suppose the caregiver 114 has used the approval matrix, described above, to include a conditional approval such that the user 102 should use a first mobility device, a robotic brace, 80% of the duration of the outing and a second mobility device, a power-assist wheelchair, for 20% of the duration of the outing as monitored by the monitor module 218. The schedule module 216 may schedule the robotic brace and the power-assist wheelchair as the mobility device 110, and further program the robotic brace and the power-assist wheelchair with the conditional approval. The mobility device data may monitor the usage of the user 102, and provide a monitor alert when the user 102 is approaching the limitation of a conditional approval. For example, the monitor module 218 may provide the monitor alert as, for example, an auditory or visual warning when the user 102 has used the secondary mobility device within a tolerance, such as 15%, of the duration of the outing.

Continuing the example from above, the monitor module 218 may also alter the operation of the second mobility device based on the conditional approval. For example, a first tolerance may be met when the second device has been in use for approximately 15% of the duration of the outing, as described above. A second tolerance may be set such that the monitor module 218 alters the operation of the second mobility device. For example, when the second mobility device has been used for approximately 18% of the duration of the outing according to the mobility device data monitored by the monitor module 218, the monitor module 218 may reduce the functionality of the second mobility device. For example, the monitor module 218 may reduce the speed of the second mobility device or disable one or more of the device sensors 252 and/or the device systems 254 of the second mobility device.

In another embodiment, a third tolerance may be set such that the monitor module 218 alters the operation of the second mobility device by disabling the secondary mobility device. For example, when the second mobility device has been used for approximately 20% of the duration of the outing according to the mobility device data monitored by the monitor module 218, the monitor module 218 may shut down the second mobility device. Although described as a three-tiered alteration response by the monitor module 218, the monitor module 218 may use more or fewer alterations. Furthermore, the alteration response may not be tiered. For example, the alteration response may be binary about the use threshold of 20%.

In yet another embodiment, the caregiver 114 may be a medical provider that wants to monitor how the user 102 uses the mobility device 110. Here, the caregiver 114 may request specific data from the monitor feed. For example, the caregiver 114 may request the physiological data about the user 102 from the device sensors 252 of the mobility device 110 and mobility device data from both the device sensors 252 and the device systems 254. Accordingly, the caregiver 114 may be able to analyze the physiological data and the mobility device data to identify trends, patterns, concerns, and/or benefits for the user 102. Therefore, caregivers can provide enhanced care to the user 102 using the monitor feed through passive monitoring.

In addition to being able to request specific data from the monitor feed of the monitor module 218, the data module 220 may aggregate the data from the monitor feed as well as other sources of data. The data module 220 may also generate request data associated with the request, user data associated with the progress of the user on the route, mobility device data associated with the mobility device, and vehicle data associated with the companion vehicle 112, among others. For example, the data module 220 may extract the one or more logistical factors from the request as request data.

The data module 220 may also generate data by integrating data from a first dataset with data from a second dataset. For example, as described above the caregiver 114 may be a medical provider that wants to monitor how the user 102 uses the mobility device 110 by observing the physiological data about the user 102 (a first dataset) and mobility device data (a second dataset). Rather than the caregiver 114 analyzing the first dataset and the second dataset separately, the data module 220 may generate a third dataset calculated based on the first dataset and the second dataset. For example, with respect to the example given above, the data module 220 may calculate the third dataset by synching the physiological data with the mobility device data in time so that the caregiver 114 can identify the physiological response of the user 102 to the use of the mobility device 110. In this manner, the data module 220 can generate data signals that can be converted into other data formats (e.g., numerical) and/or used to generate other data metrics and parameters.

In addition to the mobility system 202 generating data about the outing, the user 102 may choose to share about their experience of the transportation by posting user-content (e.g., post, update, status, tweet, image, video, live feed, meme, etc.) to one or more social media platforms using the media module 242. Social media platforms comprise a plurality of individual user accounts for publishing and delivery of their user-content to numerous recipients (e.g., friends, followers, etc.). Example social media platforms may include Facebook®, Instagram®, LinkedIn®, MySpace®, Twitter®, Blogger, LiveJournal, TypePad, WordPress, Vox, ExpressionEngine and Xanga.

The media module 242 provides an interface to facilitate sharing user-content. For example, when sharing user-content with the media module 242, the user 102 may be given the opportunity to share the user-content to one or more social media platforms. In another embodiment, the media module 242 may facilitate a direct connection with a third-party, such as a recipient or the caregiver 114. For example, the media module 242 may support using the features of the portable device 224 to communicate (e.g., make calls, video chat, text, etc.) with the third party. The media module 242 may also access components of the portable device 224. For example, suppose the user 102 captures an image with the portable device and the captured image is sorted in the device memory 230 or the device data store 232. The media module 242 may access the device memory 230 or the device data store 232 to retrieve the captured image and share the captured image as user content.

II. Methods for Providing a Mobility Service

Figure 4:
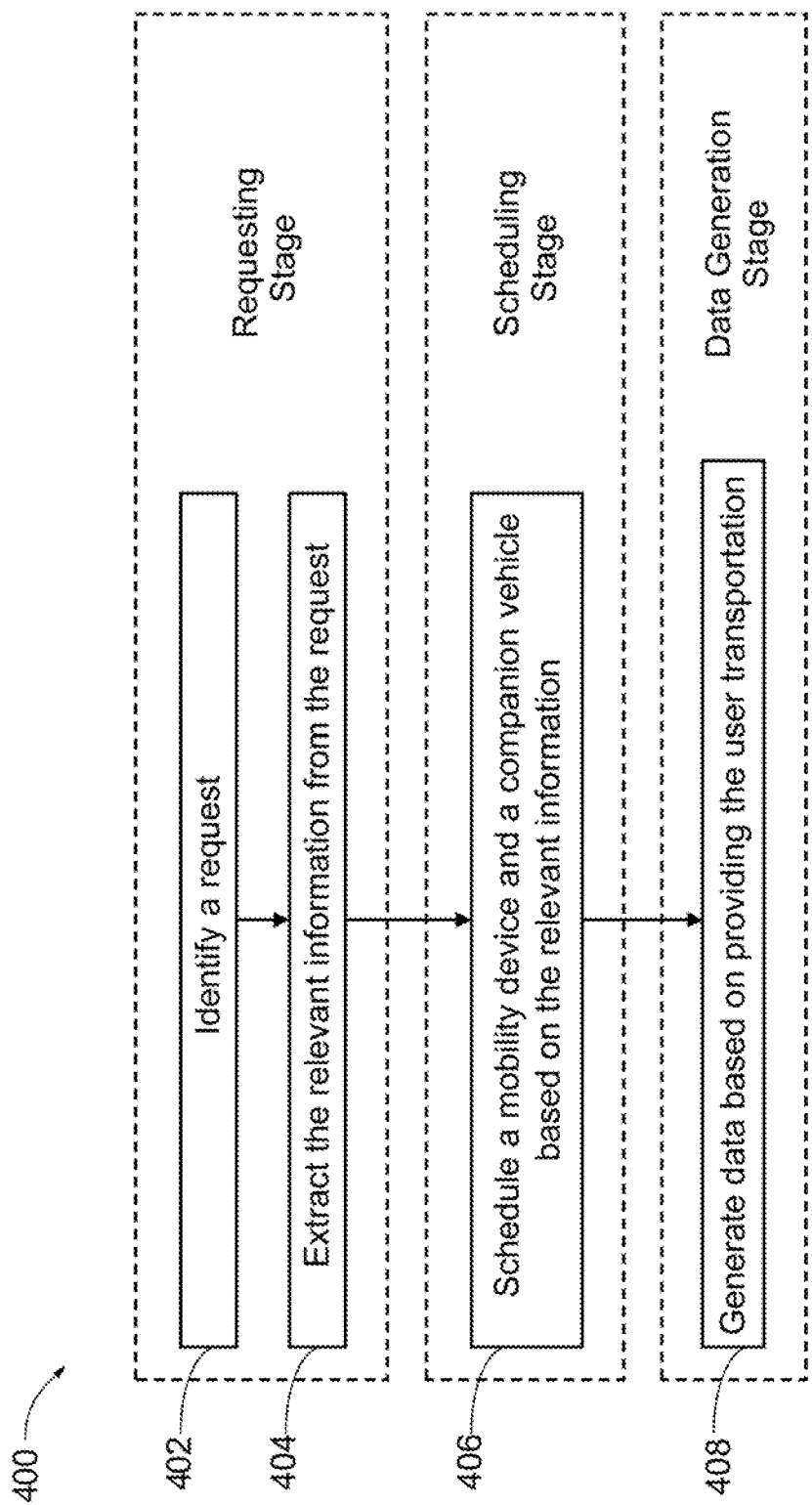
FIG. 4 is a process flow diagram of a method for providing a mobility service according to an exemplary embodiment.

Referring now to FIG. 4, a method 400 for providing a mobility service will now be described according to an exemplary embodiment. FIG. 4 will be described with reference to FIGS. 1 and 2. As shown in FIG. 4, the method for providing a mobility service can be described by three stages, namely, a requesting stage, a scheduling stage, and a data generation stage. For simplicity, the method 400 will be described by these stages, but it is understood that the elements of the method 400 can be organized into different architectures, blocks, stages, and/or processes.

In the requesting stage, the mobility system 202 identifies a request. The requesting processes described below are performed by, coordinated by, and/or facilitated by the request receiving module 214.

At 402, a request is identified. As discussed above, the request may be identified as a request received from the user 102 or the caregiver 114. For example, the user 102 may generate the request using the request generation module 236. Alternatively, the request may be identified when the request is generated. The request may be generated by the request receiving module 214 of the mobility system 202 or the request generation module 236 of the portable device based on predictive data. The predictive data may be extracted from other sources such as the electronic or online calendar or datebook, historical use patterns, third party management, among others.

At 404, relevant information is extracted from the request. The relevant information includes the one or more logistical factors. As discussed above, the logistical factors may include, but are not limited to, at least a portion of the route 104, the origin 106, the destination 108, address, coordinates, point of interest, one or more roadway names, a waypoint, a time of arrival, appointment time, the time an event is scheduled to start, a time of departure, the duration of the outing, among others. When the request is generated from predictive data, the one or more logistical factors may be derived from the predictive data directly. For example, a request may be identified when an invitation to an outing is received, and the one or more logistical factors may be derived from the predictive data associated with the invitation. Alternatively, the source of the predictive data may be included in the request.

In addition to the one or more logistical factors, the relevant information may include a candidate mobility device associated with mobility device 110 and/or a candidate companion vehicle that is associated with the companion vehicle 112 when specified. When included in the request, the candidate mobility device and/or companion vehicle may also be extracted from the request.

In the scheduling stage, the mobility system 202 schedules transportation for the user 102 based on the relevant information extracted from the request. The scheduling processes described below are performed by, coordinated by, and/or facilitated by the schedule module 216.

At 406, the mobility device 110 and the companion vehicle 112 are scheduled for the user 102 based, at least in part on, the relevant information extracted from the request as well as the candidate mobility device and/or the candidate companion vehicle, if included in the request. For example, the mobility device 110 and the companion vehicle 112 may be scheduled based on the one or more logistical factors. Both the mobility device 110 and the companion vehicle 112 are scheduled even if one of the candidate mobility device and the candidate companion vehicle or both are missing from the request. In these instances, the mobility device 110 and/or the companion vehicle 112 may be selected based on the one or more logistical factors.

In the data generation stage, the mobility system 202 generates data based on the requested transportation. The data generation stage processes described below are performed by, coordinated by, and/or facilitated by the data module 220.

At 408, the data is generated based on providing the user 102 transportation. The generated data may include request data associated with the request. The request data may include patterns, trends, and historical information about the manner in which the user 102 requests transportation. For example, if the user 102 requests a specific mobility device 110 when going to the destination 108, the data module 220 would generate data indicating the correspondence between the mobility device 110 and the destination 108. Accordingly, if a future request from the user 102 includes a logistical factor that specifies the destination 108 without the mobility device 110, the data may be used by the schedule module 216 to identify the candidate mobility device corresponding to the destination 108 and schedule the mobility device 110.

The generated data may also include user data associated with the progress of the user 102 on the route 104. The user data may include physiological data of the user 102 over the course of the outing. For example, the physiological data associated with the user 102 embarking on the companion vehicle 112, traveling to the destination 108, disembarking from the companion vehicle 112 at the destination 108, using the mobility device 110 at the destination 108, and so on. Accordingly, the user data may be indicative of the user's experience of the outing.

Additionally, the generated data may include mobility device data associated with the mobility device 110, and companion vehicle data associated with the companion vehicle 112. For example, the mobility device data may include usage data of the mobility device 110, error messages and/or alerts from the mobility device 110, or charging information of the mobility device 110 over the course of the outing. The vehicle data may include if and how the companion vehicle 112 was rerouted and why, fuel levels of the companion vehicle 112, and the timing the progress of the companion vehicle 112.

Figure 5:
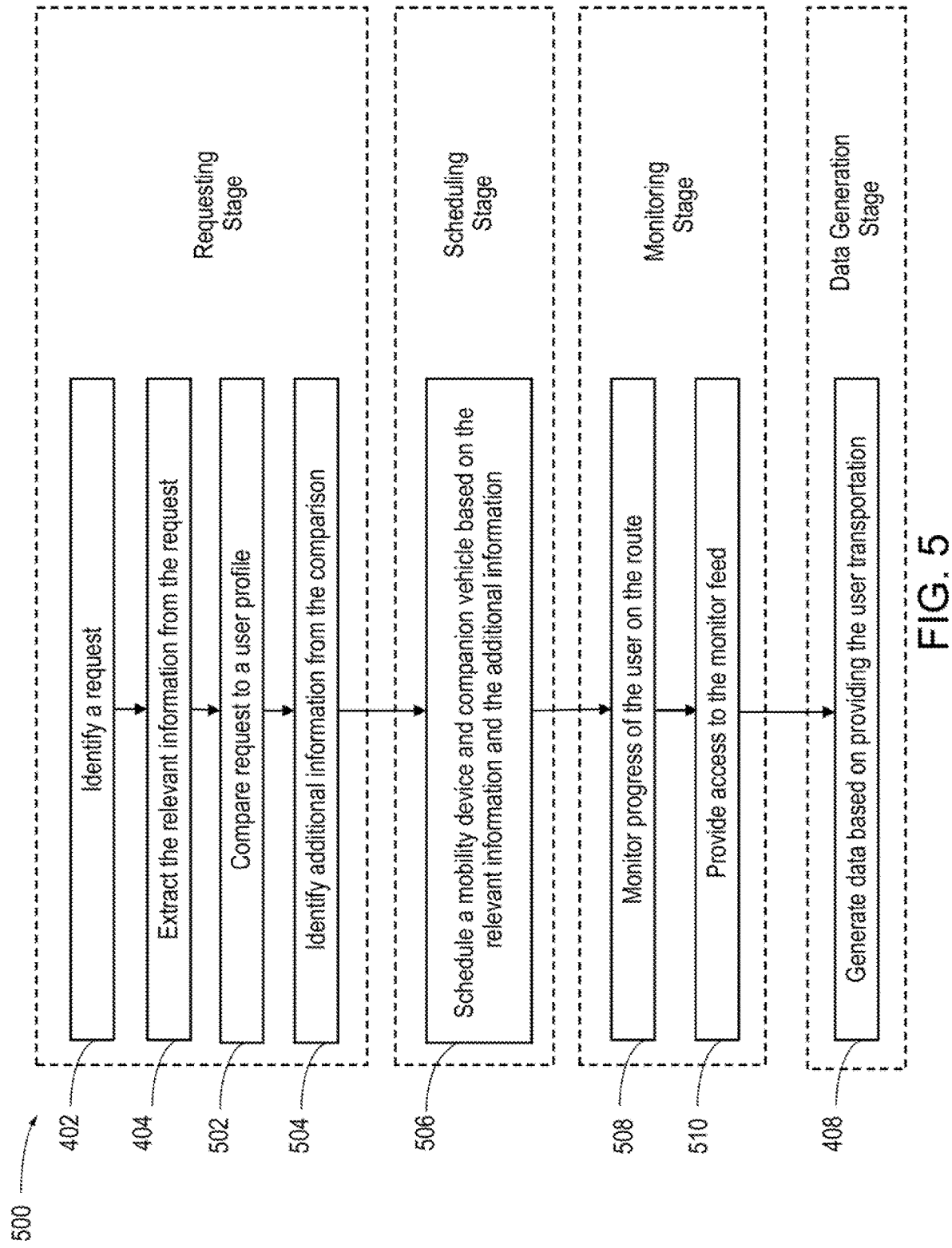
FIG. 5 is a process flow diagram of a method for providing a mobility service according to an exemplary embodiment.

Referring now to FIG. 5, a method 500 for providing a mobility service will now be described according to another exemplary embodiment. FIG. 5 will also be described with reference to FIGS. 1 and 2, as well as FIG. 4. In particular, some of the steps of FIG. 5 are described in FIG. 4, and for clarity, have the same reference number. Thus, in some embodiments, the steps of FIG. 5 described with respect to FIG. 4 are performed in a similar manner and can include the same or similar components and functionality.

As shown in FIG. 5, the method for providing a mobility service can be described by four stages including the stages from FIG. 4 including the requesting stage, the scheduling stage, and the data generation stage. Additionally, FIG. 5 includes a monitoring stage. For simplicity, the method 500 will be described by these stages, but it is understood that the elements of the method 500 can be organized into different architectures, blocks, stages, and/or processes.

As described above with respect to FIG. 4, the requesting stage includes identifying a request. At 402, a request having is identified. At 404, relevant information is extracted from the request. The requesting stage may also include, at 502, comparing the identified request to a user profile, which may provide the request some context.

As described above, the user profile includes information about the user 102, such as the user profile may include demographic information, user preferences, medical information, physiological baselines, as well as rules for the user 102. For example, the user 102 may utilize the user profile to store user preferences regarding the manner in which requests are made, relevant information in the request, or how predictive data is extracted from other sources. Therefore, the user profile may contain logistical factors not included in the request.

At 504, the method 500 includes identifying additional information from the user profile based on the comparison. For example, the user 102 may not identify a companion vehicle 112 in the request. However, the user profile may indicate that the user 102 has difficulty embarking and disembarking from particular vehicles. The user profile may also include vehicles that the user prefers as the companion vehicle 112. The preferred companion vehicle may then be specified as the candidate companion vehicle. Accordingly, the additional information may specify an additional logistical factor, mobility device 110, and/or companion vehicle 112, or indicate whether a logistical factor, mobility device 110, and/or companion vehicle 112 would be acceptable to the user 102.

In the scheduling stage, at 506, the mobility device 110 and the companion vehicle 112 are scheduled for the user 102 based, at least in part on, the relevant information extracted from the request as well as the additional information. Continuing the example from above, the schedule module 216 may schedule the user's preferred companion vehicle from the user profile as the companion vehicle 112 based on the additional information.

Continuing to the monitoring stage, at 508, at least a portion of the progress of the user 102 is monitored by the monitor module 218. As described above, the monitoring may take the form of a monitor feed including a visual representation of the route updated in real-time according to the user's progress, live-streamed data (e.g., captured images, physiological data, vehicle data, etc.), periodic data updates, among others, or a combination thereof. The monitoring may also be an aggregation of data from multiple sources such as the mobility device 110, the companion vehicle 112, the portable device 224, and/or the remote system 226.

At 510, the method 500 includes providing access to the monitor feed. The user 102 may use the monitor feed to monitor the approach of a dispatched companion vehicle 112, get an estimated time of arrival for the companion vehicle 112, etc. Alternatively, the monitor feed may be accessible by the caregiver 114. For example, the caregiver may wish to monitor the health state of the user 102 during the outing. As described above, the caregiver 114 may be able to observe the monitor feed by accessing the mobility system 202. The caregiver 114 may access the monitor feed through the network 222 using the remote system. The user 102 and/or the caregiver 114 may access a monitor interface to receive the real-time access to monitor feed or a stored monitor feed.

Figure 6:
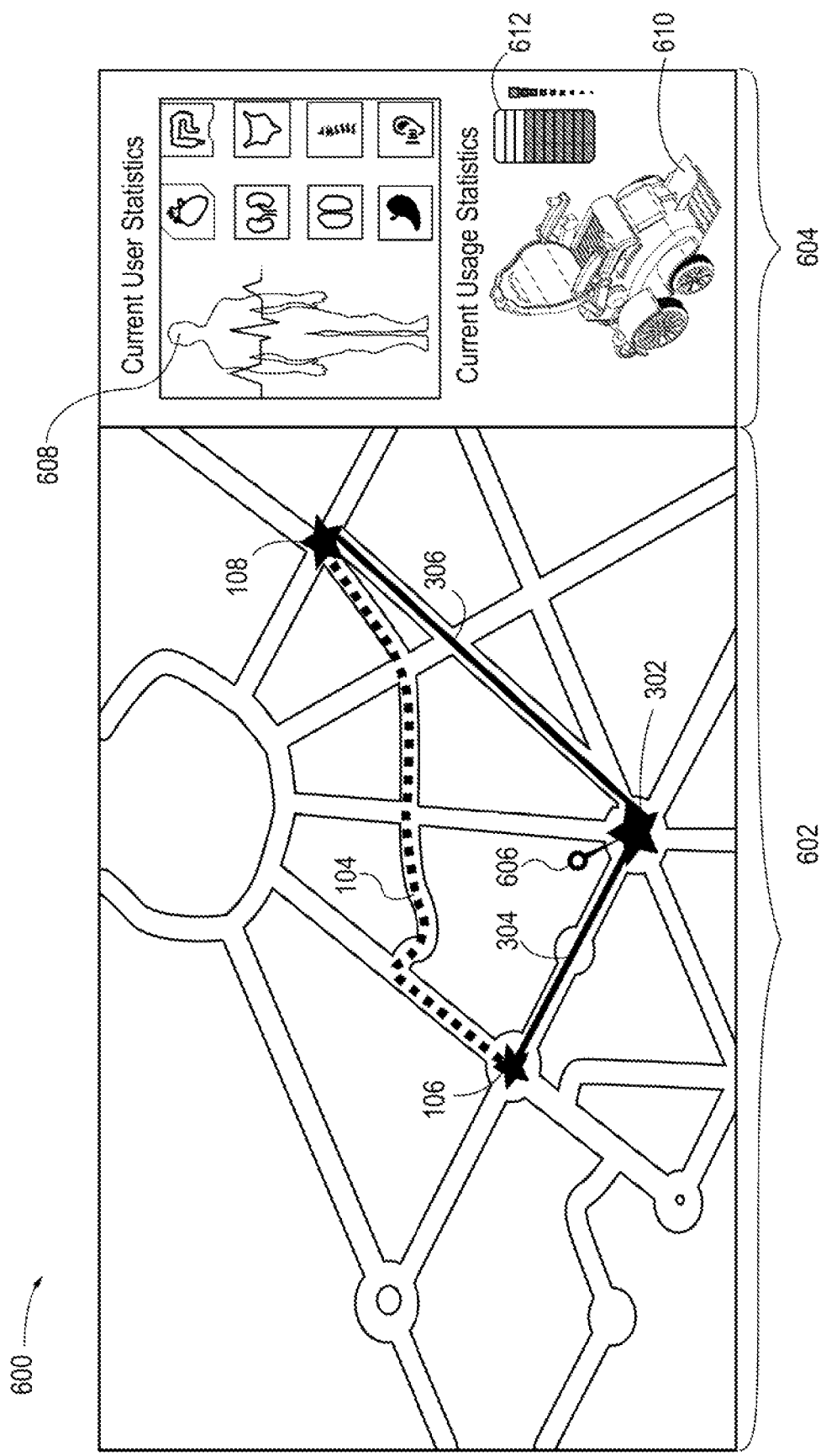
FIG. 6 is a schematic view of an exemplary monitor visual representation for providing a mobility service according to one embodiment.

Turning to FIG. 6, an exemplary monitor interface for providing a mobility service according to one embodiment is provided. The monitor interface may include a visual representation 600. In some embodiments, the visual representation 600 is generated in conjunction with an application, program, or software and displayed on the portable device 224, using the remote system, or a display (not shown) present in the companion vehicle 112. The visual representation 600 may be modified using a touch screen or input device, such as a keyboard, a mouse, a button, a switch, voice enablement, etc.

The visual representation 600 may include a map area 602 and a data area 604. Here, the map area 602 and the data area 604 are shown side by side for clarity, but one or the other may be dominant in the field of view of a user. Alternatively, the user may be able to toggle between the map area 602 and the data area 604 so that one or the other is displayed at a given time. The map area 602 and the data area 604 are exemplary nature and may rendered with different or additional features. For example, the data area 604 is shown with exemplary user data and mobility device data, however other types of data, such as vehicle data may be additionally or alternatively included in the data area 604.

The map area 602 may be rendered based on the location of the mobility device 110 and/or the companion vehicle 112. The map area 602 may be rendered using any of a number of network-based mapping tools available. Network-based mapping tools generally provide the user with on-demand textual or graphical maps of user specified locations. Further, several related systems may provide the user 102 with on-demand maps of automatically determined device locations based, for example, positioning technology such as satellite navigation (GPS, Galileo, Glonass, etc.) or as some function of Wi-Fi mapping, GSM-based cell signal mapping, RFID tracking, etc. For example, the companion vehicle 112 may be tracked based on the vehicle systems 258 including satellite navigation. In another example, the user 102 may be tracked by tracking the portable device 224. The portable device 224 may be tracked by using signal triangulation from nearby cell towers to pinpoint the location of the portable device 224. Similarly, Wi-Fi mapping may locate the user 102 by evaluating signal samples from multiple access points.

In this manner, the map area 602 can be rendered by tracking the user 102 or one or more of the device associated with the request, such as the mobility device 110, companion vehicle 112, or the portable device 224. The map area 602 can be rendered to illustrate a predetermined area centered on the user 102, the route 104, the origin 106, the destination 108, the mobility device 110, companion vehicle 112, or the portable device 224 as selected by the user 102 or the caregiver 114. In some embodiments, the user 102 and/or the caregiver 114 can select the size of the predetermined area or change the size of the predetermined area of the map area 602 based on a desired radius.

The map area 602 may be displayed on the portable device 224 such that the user 102 can see, select, and/or track the mobility device 110 and/or companion vehicle 112 that are providing the mobility service. For example, the user 102 may wish to check on the status and/or approach of the companion vehicle 112 as it arrives to pick-up the user 102. In another embodiment, the map area 602 may be displayed on the portable device 224 so that a user can generate a subsequent request while the user is traveling the route 104. Suppose the user 102 requested the route 104 between the origin 106 and the destination 108, as shown in FIG. 1. The user may wish to add a stop such as waypoint 302 shown in FIG. 3. The user 102 can select the waypoint 302 by placing a destination indicator 606 in the map area 602. When the user 102 alters the route 104 in this manner, the data area 604 may show a request generator, which may be a fillable form or voice recognition interface.

The data area 604 may additionally illustrate the generated data of the data module 220. For example, an avatar 608 representing the user 102 in real-time may illustrated with physiological data measured by the device sensors 252 of the mobility device 110 as well as other physiological sensors that may be directly monitoring the user 102. The data module 220 may be aggregating physiological data from multiple sources to generate the avatar 608. Properties of the avatar 608 may indicate the health status of the user 102. The health status describes the current condition of the user 102. For example, the illustrated pattern, intensity, and/or color of the avatar 608 may correspond to a level of the user's health status. In one embodiment, the avatar 608 being illustrated as blue may indicate that the physiological data of the user 102 is within a predetermined threshold of one or more baselines, while the avatar 608 being illustrated in red may indicate the physiological data of the user 102 has exceeded the predetermined thresholds of one or more baselines. The avatar 608 may also be illustrated on a continuum of colors.

In another embodiment, the health status of the user 102 may be represented in the data are 604 as a percentage, a value between 1 and 10, a non-numerical value, a discrete state, a discrete value, a continuous value, among others. Likewise, individual health statistics (e.g., rate, heart rate pattern, blood pressure, oxygen content, etc.) may be displayed or selectable.

As illustrated, the data area 604 may show a schematic 610 of the mobility device 110 in the position and/or orientation that the mobility device 110 is placed in real-time. In some embodiments, the device systems 254 of the mobility device may be in computer communication with the visual representation 600 such that alterations to the schematic 610 cause a corresponding change to the mobility device 110. For example, if the seat back of the schematic 610 is tilted up, the seat back of the mobility device 110 would be tilted up in a corresponding manner. While the schematic 610 corresponds to the mobility device 110 here, the schematic 610 could also be of the companion vehicle 112, and thus changes to the schematic 610 would be in computer communication with the vehicle systems and cause changes to the companion vehicle 112, for example, turning on an infotainment center, changing the volume of the radio, turning on the air conditioner, etc. For example, the user 102 may not be able to access the controls for the vehicle systems 258 when using the mobility device 110, for example, seated in a wheelchair, in the companion vehicle 112. However, the user 102 may be able to access the portable device 224. Accordingly, the controls for the vehicle systems 258 may be accessible using a schematic of the companion vehicle 112.

The data area 604 may also show mobility device data or vehicle data. For example, a status bar 612 may indicate the charging information including the charge status of the mobility device 110. Alternatively, if the user 102 and/or caregiver has placed a limit on the amount that the user 102 may use the mobility device the status bar 612 may indicate how much use of the mobility device 110 that the user has left. In another example the status bar 612 may indicate a logistical factor, such as how much time left the user has at the scheduled. For example, suppose the user 102 is attending a family event with pick up at the destination 108 being scheduled at a certain time to return the user 102 to the origin 106. The status bar 612 may indicate the remaining time.

The avatar 608, the schematic 610, and the status bar 612 are exemplary in nature, and the data area 604 may have one, some, or none of them displayed. Instead the user 102 or the caregiver 114 may have a mobility service dashboard displayed in the data are 604 that the user 102 or the caregiver 114 has customized to be suited the needs of the user 102 or the caregiver 114. Moreover, as described the data area 604 as well as the map area 602 may be dynamic in nature and change to meet the preferences or expectations of the user 102 or the caregiver 114.

Returning to FIG. 5, the method 500 continues to 408 where the data is generated based on providing the user 102 transportation. As described above with respect to FIG. 4, the generated data may include one or more of request data associated with the request, user data associated with the progress of the user 102 on the route 104, mobility device data associated with the mobility device 110, and vehicle data associated with the companion vehicle 112.

Figure 7:
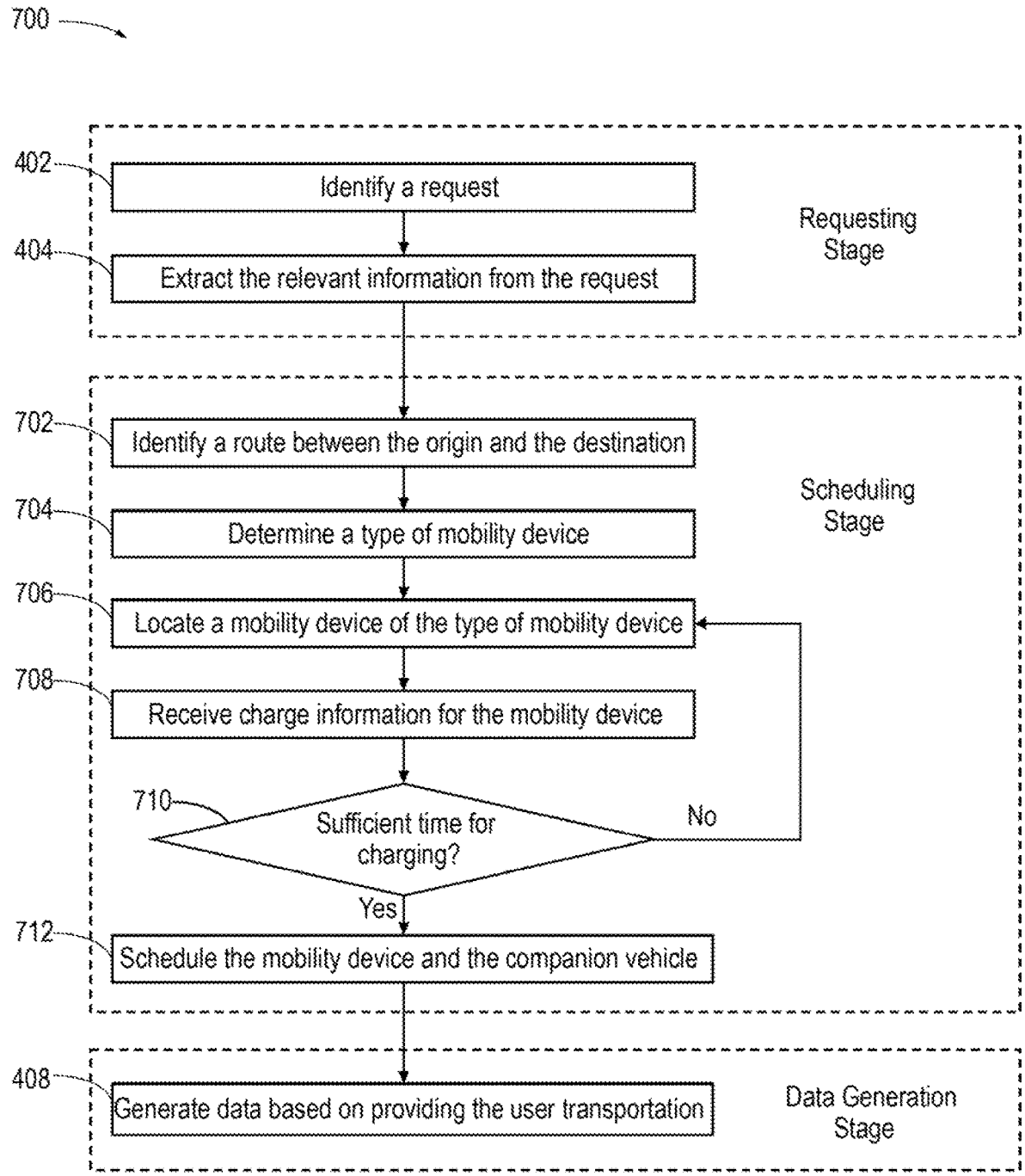
FIG. 7 is a process flow diagram of a method for providing a mobility service with a chargeable mobility device according to an exemplary embodiment.

FIG. 7 is a process flow diagram of a method for providing a mobility service with a chargeable mobility device according to an exemplary embodiment. FIG. 7 will also be described with reference to FIGS. 1, 2, 4 and 5. In particular, some of the steps of FIG. 7 are described in FIG. 4, and for clarity, have the same reference number. Thus, in some embodiments, the steps of FIG. 7 described with respect to FIG. 4 are performed in a similar manner and can include the same or similar components and functionality. As shown in FIG. 5, the method for providing a mobility service can be described by four stages including the requesting stage, the scheduling stage, the monitoring stage, and the data generation stage. For simplicity, the method 700 of FIG. 7 will be described by these stages, but it is understood that the elements of the method 700 can be organized into different architectures, blocks, stages, and/or processes.

As described above with respect to FIG. 4, the requesting stage includes identifying a request. At 402, a request having is identified. At 404, relevant information is extracted from the request. For example, suppose the request includes relevant information including the origin 106 and the destination 108 as well as the timing.

At 702, the method includes supplementing the request with any additional logistical factors and information not included in the request. For example, here, a route 104 has not been provided. Therefore, the schedule module 216 may determine a route 104 between the origin and the destination by accessing mapping tools such as positioning technology such as satellite navigation (GPS, Galileo, Glonass, etc.) or as some function of Wi-Fi mapping, GSM-based cell signal mapping, RFID tracking, etc. Therefore, the schedule module 216 may access remote devices (e.g., databases, web servers, remote systems, application servers, intermediary servers, client machines, other portable devices) using the network 222.

At 704, the method 700 includes determining a type of the mobility device 110. For example, the type of the mobility device 110 may be determined based on the logistical factors included in the request, such as where the user 102 will be, the origin 106, and where the user plans to go, the destination 108. The type of the mobility device 110 may also be determined based on the user profile. For example, the user profile may indicate that a high percentage of the time that the user 102 is going to the destination 108, that the user 102 uses a specific mobility device 110 or a type of the mobility device 110. In another embodiment, the type of the mobility device 110 may be determined based on historical trends or patterns associated with the user 102. Also, the caregiver 114 may be prompted to select the type of the mobility device 110 based on the user's medical care.

At 706, an available mobility device of the type of mobility device is located. The available mobility device is available if the user 102 would be able to use the mobility device 110 for the planned outing including on the planned route 104, at the origin 106, at the destination 108, and any other location, legs, or routes that the user 102 may request. An unavailable mobility device is unavailable if the mobility device 110 cannot be used by the user 102, for example, if the unavailable mobility device will be in use by a different user, down for maintenance, or is unable to accommodate the user 102. In some embodiments, the schedule module 216 may maintain a plurality of mobility devices and a plurality of types of mobility devices. Therefore, the schedule module 216 may maintain a status listing and schedules for the mobility devices associated with the mobility system 202. Accordingly, the schedule module 216 can determine whether a mobility device 110 is an available mobility device or an unavailable mobility device, and where the mobility device 110 will be located.

At 708, charging information for the available mobility device is received. For example, the current charge level or the predicted charge level of the available mobility device may be received. The charging information may also include how efficiently the available mobility device is able to be charged, how efficiently the available mobility device stay charged, the charge rate, charge usage rate, and the charge usage rate based on different functionality or modes, among others. The charging information may further include timing information related to charging, for example, the amount of time needed to change given different types of charging platforms.

At 710, it is determined whether there is sufficient time to charge the available mobility device. The user 102 may need the available mobility device to have a threshold charge level to function on the outing. The threshold charge level may be a total charge, for example, a 100% charge. The threshold charge level may be calculated based on the relevant information, including the one or more logistical factors, from the request, user data, or historical data for one or more users. For example, the threshold charge may be based on how much time one or more users typically spend at the destination 108. The threshold charge may be additionally based on supplemental information extracted from other sources or determined by the schedule module 216. In this manner, the threshold charge level can be dynamic and calculated specific to the request, the user 102, or the user profile.

In another embodiment, the threshold charge level may be a static determination. For example, the threshold charge level for the available mobility device is set to a specific value regardless of the user or the request. The threshold charge level may also be defined by the type of mobility device that the available mobility device is. Therefore, there are a number of ways that the threshold charge level can be determined. The threshold charge level is then used, at 710, to determine whether there is sufficient time to charge the available mobility device based on the charging information.

For example, the received charging information of the available mobility device may include that the charge level of the available mobility device will be at 20% when a different user is done with the availability device. Suppose, the available mobility device may be located 7 miles or approximately 10 minutes from the origin 106 identified by the user 102 in the request and the available mobility device can be charged in a companion vehicle 112 to the available mobility device. Using the charging rate of the available mobility device, the schedule module 216 can determine whether the 10 minutes is enough time to charge the available mobility device with the companion vehicle 112 to the threshold charge level.

If there is not sufficient time to charge the available mobility device, the method 700 returns to 706 to locate another available mobility device and the steps 708 and 710 are repeated for the other available mobility device. Continuing the example from above, if 10 minutes is insufficient time to charge the available mobility device, another available mobility device is locates at 706.

In some embodiments, once it is determined that there is not sufficient time to charge the available mobility device to the threshold charge level, the available mobility device may be redefined as an unavailable mobility device. In some embodiments, other charging platforms, such as other companion vehicles capable of charging, different sources of power (e.g., batteries, AC power, DC power, etc.) may be considered before a determination regarding the availability of the mobility device is made.

If there is sufficient time to charge the available mobility device, the method continues to 712. Continuing the example from above, if 10 minutes is sufficient time to charge the available mobility device, the method 700 continues to 712. At 712, the available mobility device is set as the candidate mobility device, and the mobility device 110 and the companion vehicle 112 corresponding to the candidate mobility device are scheduled for the user 102. Thus, the mobility device 110 is scheduled based, at least in part on, the determination that there is sufficient time to charge the mobility device 110 as well as the relevant information extracted from the request. For example, the mobility device 110 and the companion vehicle 112 may be scheduled based given the travel time from the location to the origin where the user 102 will be picked up. Accordingly, scheduling information determined during the scheduling stage may also be used to schedule the mobility device 110 and the companion vehicle 112.

The method 700 continues to 408 where the data is generated based on providing the user 102 transportation. As described above with respect to FIG. 4, the generated data may include one or more of request data associated with the request, user data associated with the progress of the user 102 on the route 104, mobility device data associated with the mobility device 110, and vehicle data associated with the companion vehicle 112. The generated data may also include charging information such as determining whether the companion vehicle 112 did have sufficient time to charge the mobility status, by how much the charge of the mobility device 110 was increased, and the current charge of the mobility device. Therefore, the mobility system 202 can learn whether certain pairings of mobility devices with companion vehicles are efficient with respect to charging.

The mobility system 202, described in the embodiments above, has elements and features that allow the mobility system 202 to provide a mobility service to users that may need both and mobility device 110 and a companion vehicle 112 to facilitate transportation during outings. Although the transportation is described with respect to outings, the user may use the mobility device 110 and/or companion vehicle 112 within an institution and/or campus. Therefore, the mobility system 202 can assist users with moving throughout their environment, community, and the world, making the environment, their community, and the world more accessible to users. The mobility system 202 also provides users and caregivers the information, accessibility, and control to enhance the user's care. The mobility system 202 also provides monitoring capability for the users and caregivers.

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules, or other data. Non-transitory computer readable storage media excludes transitory and propagated data signals.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for providing a mobility service, comprising:
   receiving a request, from a user, including a candidate mobility device, associated with a mobility device to assist mobility of the user, and at least one logistical factor, wherein logistical factors include timing, an origin, and a destination;
   selecting a companion vehicle from a vehicle fleet having a plurality of vehicles based on the candidate mobility device of the request;
   scheduling the mobility device and the companion vehicle for the user based on the at least one logistical factor, wherein the companion vehicle is to provide the user transportation on at least a portion of a route between the origin and the destination; and
   generating data based on providing the user transportation including one or more of request data associated with the request, user data associated with the progress of the user on the route, mobility device data associated with the mobility device, and companion vehicle data associated with the companion vehicle.

2. The computer-implemented method of claim 1, further comprising:
   requesting approval from a caregiver to schedule the request; and
   receiving the approval from the caregiver.

3. The computer-implemented method of claim 2, wherein the caregiver is a medical provider associated with the user.

4. The computer-implemented method of claim 1, further comprising:
   comparing the request to a user profile, wherein the user profile includes information about the user; and
   identifying an additional logistical factor from the user profile.

5. The computer-implemented method of claim 4, wherein the user profile includes an approval matrix that includes allowed logistical factors, conditional logistical factors, and prohibited logistical factors, and wherein the request is compared to the approval matrix and scheduling the mobility device and the companion vehicle is further based on the comparison.

6. The computer-implemented method of claim 5, wherein the approval matrix is maintained by a caregiver.

7. The computer-implemented method of claim 1, wherein the mobility device data includes charging information about the charge status of the mobility device.

8. The computer-implemented method of claim 1, further comprising:
   sending the generated data to a caregiver when the at least one logistical factor is reached.

9. The computer-implemented method of claim 1, further comprising:
   monitoring progress of the user on the portion of the route; and
   providing real-time access to a caregiver to monitor the progress of the user on the portion of the route.

10. The computer-implemented method of claim 1, further comprising:
    comparing the request to a user profile, wherein the user profile includes rules regarding the transportation of the user, and wherein the rules are determined by a caregiver of the user; and
    identifying an additional logistical factor from the user profile based on the rules.

11. A system for providing a mobility service, comprising:
    a request receiving module configured to:
    receive a request from a user, the request including a candidate mobility device associated with a mobility device to assist the mobility of the user and at least one logistical factor, wherein logistical factors include timing, an origin, and a destination;
    compare the request to a user profile including information associated with the user; and
    identify an additional logistical factor from the user profile based on the request; and
    a schedule module configured to:
    select a companion vehicle from a vehicle fleet having a plurality of vehicles based on the candidate mobility device of the request; and
    schedule the mobility device and the companion vehicle for the user based, at least in part on, the comparison, wherein the companion vehicle provides the user transportation on at least a portion of a route between the origin and the destination; and
    a data module configured to generate data including one or more of request data associated with the request, user data associated with the progress of the user on the route, mobility device data associated with the mobility device, and companion vehicle data associated with the companion vehicle.

12. The system of claim 11, wherein the request receiving module is further configured to access other sources to supplement the request.

13. The system of claim 11, wherein the user profile includes an approval matrix that includes allowed logistical factors, conditional logistical factors, and prohibited logistical factors.

14. The system of claim 13, wherein the approval matrix is maintained by a caregiver.

15. The system of claim 11, wherein the schedule module is further configured to maintain the vehicle fleet.

16. The system of claim 11, further comprising a monitor module configured to monitor progress of the user on the portion of the route.

17. The system of claim 11, wherein the data module is further configured to update the user profile with the generated data.

18. A non-transitory computer-readable storage medium storing instructions that, when executed by a computer, causes the computer to perform a method comprising:
    receiving a request, from a user, including a candidate mobility device associated with a mobility device to assist the mobility of the user and one or more logistical factors, wherein logistical factors include timing, an origin, and a destination;
    selecting a companion vehicle from a vehicle fleet having a plurality of vehicles based on the candidate mobility device of the request;
    scheduling the mobility device and the companion vehicle for the user based, at least in part on, the one or more logistical factors, wherein the companion vehicle is to provide the user transportation on at least a portion of a route between the origin and the destination; and generating data including one or more of request data associated with the request, user data associated with the progress of the user on the route, mobility device data associated with the mobility device, and companion vehicle data associated with the companion vehicle.

19. The non-transitory computer-readable storage medium of claim 18, further comprising:
monitoring progress of the user on the portion of the route; and
providing real-time access to a caregiver to monitor the progress of the user on the portion of the route.

20. The non-transitory computer-readable storage medium of claim 18, further comprising:
comparing the request to a user profile; and
identifying an additional logistical factor from the user profile, wherein the additional logistical factor is also used to schedule the mobility device and the companion vehicle for the user.

* * * * *